Sept. 2, 1952   F. G. BOUCHER ET AL   2,609,513
REMOTE READING COMPASS UNIT
Filed Oct. 27, 1949   2 SHEETS—SHEET 2

Frank G. Boucher
Alexander B. Hildebrandt   Inventors
By W.W.T Heilman   Attorney Patented Sept. 2, 1952

2,609,513

UNITED STATES PATENT OFFICE 2,609,513

REMOTE READING COMPASS UNIT

Frank G. Boucher and Alexander B. Hildebrandt, Tulsa, Okla., assignors to Standard Oil Development Company, a corporation of Delaware Application October 27, 1949, Serial No. 123,892

7 Claims. (Cl. 250—224)

1

The present invention concerns a new and improved device for remotely determining orientation. More particularly the invention relates to an apparatus for determining and continuously recording at the surface of the earth the orientation of a well-logging instrument or related device while it is in an uncased bore hole at any desired depth.

In conducting various operations in the drilling or logging of oil wells or in other locations which are normally inaccessible to the operator it is often desirable to determine the orientation of a tool or exploring device or the like in the remote location. For example, in apparatus that is used for determining the dip and strike of strata through which a hole has been bored it is obvious that the orientation of a point on the logging device with respect to magnetic north must be known in order that an accurate determination of dip and strike can be made.

It is an object of this invention to provide an improved device for determining and for continuously recording at a remote point the position of an object or instrument in a bore hole with respect to magnetic north. It is a further object of the invention to provide a device which may be used in conjunction with inclination devices, profiling devices and the like to aid in the logging of bore holes.

Briefly the apparatus of the present invention comprises a compass device carried on a float in a transparent oil-filled chamber and supported on a universal pivot so as to permit some degree of tipping of the device from the vertical, the compass device being provided with an arcuate reflecting strip so placed that it will reflect light from a light source into a light-sensitive cell, the light source and the light-sensitive cell being adapted to rotate about the transparent chamber so as to pick up in the sensitive cell a pulse that will be indicative of the position of the compass with respect to a reference point on the apparatus.

Figure 1:
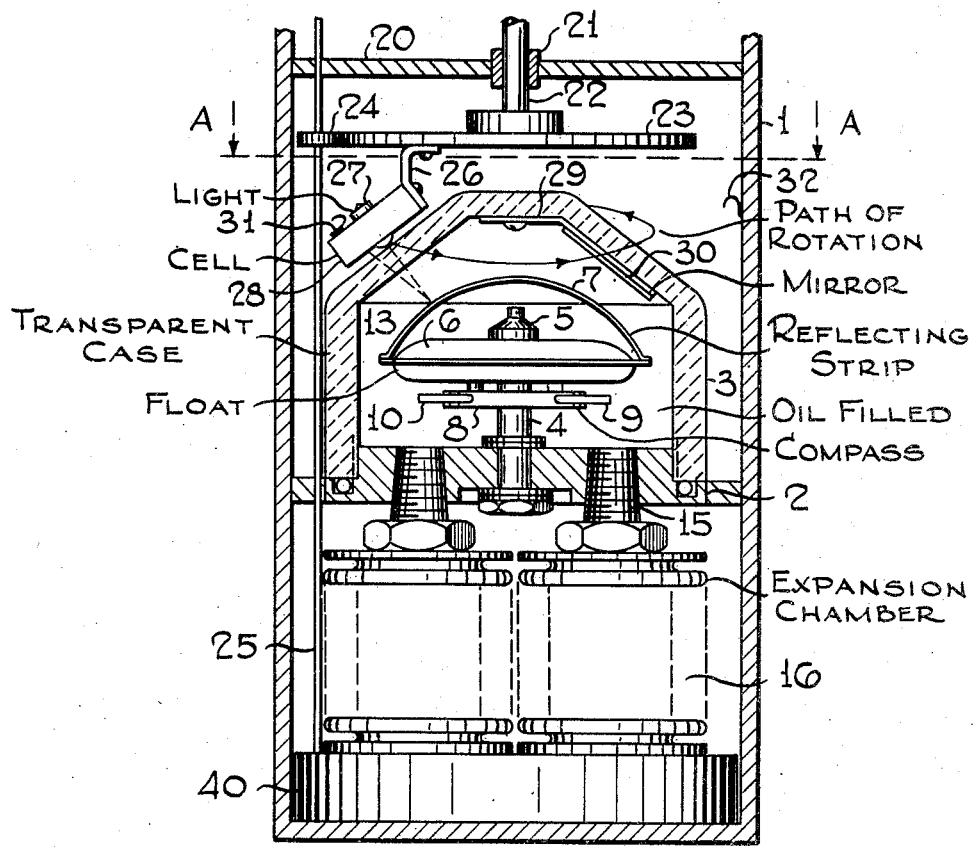
Figure 2:
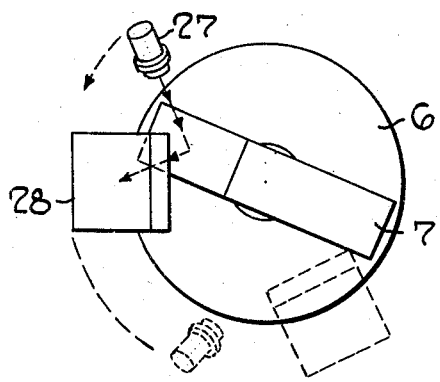
Figure 4:
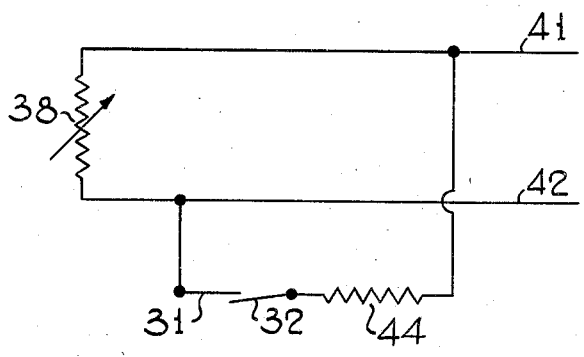
Figure 3:
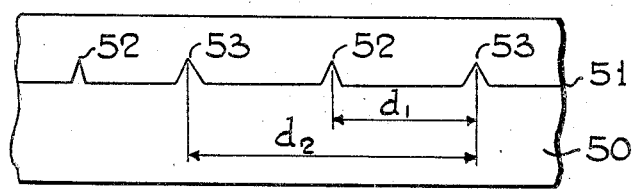

The nature and objects of the present invention will be more fully understood from the ensuing description when considered in conjunction with the accompanying drawings in which Fig. 1 represents a vertical view partly in section of one embodiment of the present invention; Fig. 2 represents a top view taken along line A—A of Fig. 1, with supporting structures removed; Fig. 3 depicts a record of impulses from the apparatus of Fig. 1 during use; and Fig. 4 presents a diagram of an electrical circuit to be used in one embodiment of the invention.

Referring now specifically to Fig. 1 the apparatus illustrated may be suitably housed within a case 1 which may represent a portion of a larger case containing other instruments to be used in conjunction herewith. Preferably case 1 and the associated parts should be constructed of non-magnetic material such as brass or the like in order that the operation of the compass will not be interfered with. It is understood of course that the case employed may be of any desired design and may be adapted for use with any apparatus that may be placed in an oil well. Fixed within case 1 is a base member 2 which supports a transparent case 3 in such a manner that an oil-tight chamber 13 is provided. Transparent case 3 may be constructed of shock resistant glass or of any suitable transparent material having a softening point above the temperature to be encountered in the well or in any other location in which the instrument is to be employed.

Attached to base 2 is a vertical support member 4 having at its upper end a universal pivot 5 on which is supported a float member 6. Suspended below float 6 is a compass support 8 to which are attached a pair of bar magnets 9 and 10. Attached to float member 6, and disposed in a vertical plane defined by pivot 5 and bar magnets 9 and 10 is an arcuate reflecting strip 7 which may suitably be made from a flat strip of highly reflective non-magnetic material. Approximately one-half of strip 7 is preferably covered with a non-reflective coating.

By means of threaded connections 15 one or more expandible chambers 16 are attached to base 2 so that the interior of chamber 16 is in communication with chamber 13. Chamber 16 is preferably constructed with a metal bellows so as to provide for volume changes caused by variations in the temperature of the oil that fills chamber 13.

Fixed to case 1 above transparent case 3 is a support bracket 20 to which is attached a bearing 21 supporting a rotatable shaft 22. To the lower end of shaft 22 is fastened a geared wheel 23 from which is suspended a bracket 26 which supports a light source 27 and a light-sensitive cell 28, each of these elements being supported close to the exterior of transparent case 3 so that light from light source 27 will be reflected into light sensitive cell 28 during some portion of a complete rotation of geared wheel 23. The relationship of light source 27 to reflecting strip 7 and cell 28 is shown in Fig. 2, supporting structures being omitted for purpose of clarity.

Affixed to the top of case 3 is a bracket 29 to which is attached a mirror 30 so positioned that it will also reflect light from source 27 into cell 28 during some portion of a complete rotation of geared wheel 23. Shaft 25 is adapted to be driven by power source 40 which may be a conventional spring wound constant speed motor or a constant speed electric motor or the like. Shaft 25 may be suitably extended upwardly within case 1 to operate one or more other devices in conjunction with the apparatus of this invention. Thus, for example, shaft 25 may simultaneously operate an inclinometer device such as that disclosed and claimed in copending application Serial No. 72,515 of Alexander B. Hildebrandt, filed January 24, 1949, and the said inclinometer and the orientation device of the present invention may both be employed in a bore hole logging apparatus such as that disclosed and claimed in copending application Serial No. 90,324 of Frank G. Boucher, filed April 29, 1949.

In operation, shaft 25 is driven by constant speed power source 40 and in turn causes wheel 23 to rotate at a constant speed and thus move light source 27 and light sensitive cell 28 around the circumference of transparent case 3. As the reflecting half of reflecting strip 7 intercepts a light beam from light source 27 the beam is reflected back into cell 28 and generates a pulse therein which may be suitably recorded on a record strip at a remote observation point as described below. A second pulse is generated in cell 28 as the light beam is intercepted by mirror 30. By providing mirror 30 with more reflecting surface than reflecting strip 7 the pulse picked up by reflection from the former will be of larger amplitude than that from the latter, thus enabling the two to be readily distinguished.

Conventional means may be used for supplying electrical current to light source 27 and for conducting electrical impulses from light sensitive cell 28 to a recording device at the earth's surface. Such means will include the usual slip rings and sliding contacts to transfer current from the rotating portion of the device to the non-rotating cable. Such means are conventional and are therefore omitted from the drawing in order that the latter will not be unduly complicated. The electrical pulses received at the earth's surface can be recorded by conventional means as for example, by causing them to actuate a recording galvanometer which will produce a trace on a moving sheet of paper by means of an inking pen or on a moving photographing paper or film by means of a beam of light. The paper or film in the conventional recording means is preferably moved through the recorder at a uniform rate in order that the record may be interpreted more simply and accurately.

A sample record showing the traces recorded when using a device such as that depicted in Fig. 1 is shown in Fig. 3. On this record trace 51 is shown to have several "kicks" designated by reference numerals 52 and 53. Kicks 52 are those representative of pulses picked up by cell 28 upon reflection of light from strip 7 whereas kicks 53 represent pulses picked up by mirror 30. Inasmuch as the paper is fed through the recording instrument at a uniform speed and since light 27 and cell 28 have been rotated about the compass at a uniform rate it is a simple matter to determine from the relative distances between successive kicks 53 and adjacent kicks 52 the position of mirror 30 with reference to the reflecting half of reflecting strip 7. Thus, if the distance between successive kicks 53 on chart 50 is designated as $d_2$ and the distance between a kick 52 and an adjacent kick 53 as $d_1$, then $$\frac{d_1}{d_2} \times 360$$

will equal the azimuthal relation of the reflecting half of strip 7 and mirror 30.

As an alternative to providing for a pulse representative of the position of a point on case 1 by reflection from mirror 30, such a pulse may be obtained by direct electrical contact. For example, a looped contact wire 31 may be affixed to the housing of cell 28 in such a manner as to brush against a second contact wire 32, affixed to case 1, during some portion of a complete rotation of gear 23, and thus momentarily close an electrical circuit leading to the recorder at the earth's surface. Contact wires 31 and 32 are preferably made of gold alloy or else are gold plated to ensure good electrical contact.

A suitable circuit for utilizing the contacts 31 and 32 in the circuit employed for sensitive cell 28 is shown in Fig. 4. Variable resistor 38 represents the variable resistance presented by sensitive cell 28 which is constructed so that its resistance is lowered when a light beam is directed into it. By suitable leads 41 and 42 variable resistance 38 is connected to conventional means for detecting changes therein and recording them with a recording galvanometer as hereinbefore mentioned. When contact 31 engages contact 32, resistor 44 is cut in across leads 41 and 42, thus lowering the effective resistance through resistor 38 and giving essentially the same effect to the recording circuit as an increase in the amount of light entering cell 28 would by lowering the resistance of resistor 38. Resistor 44 may conveniently be attached to case 1 adjacent contact wire 32 but, in the interests of preventing undue complication of the drawing, is not shown in Fig. 1.

The method just described for introducing a reference pulse or "lubbers line" pulse into the recording circuit has an advantage in that the reference pulse will be sharper than the pulse received by reflection of light into cell 28, so that the two pulses can be readily distinguished.

The advantages of the orientation apparatus of this invention are readily apparent from the embodiment described in Fig. 1. First of all, by providing oil-filled chamber 13, motion of the compass is damped and more reliable readings are obtained. Secondly, positioning of member 6 on a universal pivot ensures that the compass element will be maintained in a horizontal position even though the instrument case is tilted at an appreciable angle from the vertical, thus providing for an accurate orientation of the compass. Curved reflector strip 7 ensures that light will be reflected into sensitive cell 28 regardless of the tipping of the instrument case, and thus of bracket 26, from the vertical.

It is to be understood that this invention is to be limited only by the following claims and not by the specific embodiments described herein, which may be modified in many particulars without departing from the scope of the invention.

What is claimed is:

1. A device for remotely indicating orientation comprising a non-magnetic case, a fluid-tight chamber disposed within said case, at least a portion of said chamber being transparent to light, a universal pivot supported within said chamber, a float member pivotally attached to said pivot, a compass device fixed to said float member, an arcuate reflecting strip of flat cross section attached to said float member and disposed in a vertical plane defined by said pivot and the north and south poles of said compass device, a source of light rotatably attached to said case and adapted to revolve about said compass, a light-sensitive cell rotatably attached to said case and adapted to revolve about said compass in fixed relation to said light source and so positioned as to receive reflected light from said reflecting strip during some portion of a complete revolution of said light source and said sensitive cell about said compass, a second reflective surface fixed to said case in such a position as to reflect light from said light source into said sensitive cell during some portion of a revolution of said light source and said sensitive cell about said compass, and means for revolving said light source and said sensitive cell at a uniform rate.

2. Device according to claim 1 including a wheel rotatably mounted on said case with its axis vertical and in substantial alignment with said pivot, a bracket fixed to said wheel and supporting said light source and said sensitive cell and means for rotating said wheel at a uniform rate.

3. A device for remotely indicating orientation comprising a non-magnetic case, a fluid-tight chamber disposed within said case, at least a portion of said chamber being transparent to light, a universal pivot supported within said chamber, a float member pivotally attached to said pivot, a compass device fixed to said float member, an arcuate reflecting strip of flat cross section attached to said float member and disposed in a vertical plane defined by said pivot and the north and south poles of said compass device, a wheel rotatably held by said case with its axis vertical and in substantial alignment with said pivot, means for periodically rotating said wheel, a bracket fixed to said wheel, a source of light and a light-sensitive cell supported by said bracket in such a manner that upon rotation of said wheel said light-sensitive cell will receive reflected light from said reflecting strip during some portion of a complete revolution of said wheel, a contact point fixed to said case, and a second contact point fixed to said bracket and engageable with said first named contact point during a portion of the rotation of said wheel.

4. Device according to claim 3 in which said sensitive cell has a variable electrical resistance element adapted to vary in resistance according to the intensity of light received by said cell, said device also including a fixed resistor, one of said contact points being connected through said fixed resistor to one side of said variable resistance element and the other of said contact points being connected to the other side of said variable resistance element.

5. A device for remotely indicating orientation comprising a non-magnetic case, a universal pivot supported by said case, a compass device pivotally supported on said universal pivot, an arcuate reflecting strip attached to said compass device and disposed in a vertical plane passing through the pivot, a rotatable support held by said case, a light source held by said rotatable support in a manner adapting it to revolve about said compass, a light-sensitive cell held by said rotatable support in fixed relation to said light source and so positioned as to receive reflected light from said reflecting strip during some portion of a rotation of said rotatable support, means for periodically rotating said rotatable support, and reference means mounted on said case in cooperative relation with a selected point on said rotatable support whereby a reference point on said case will be related to a reference point on the rotatable support during the rotation of said rotatable support.

6. Device according to claim 5 in which said reference means comprises a second reflective surface fixed to said case in such a position as to reflect light from said light source into said sensitive cell during some portion of the rotation of said rotatable support.

7. Device according to claim 5 in which said reference means comprises a contact member fixed to said case, said rotatable support carrying a second contact member engageable with said first named contact member during some portion of a rotation of said rotatable support.

FRANK G. BOUCHER.
ALEXANDER B. HILDEBRANDT.

REFERENCES CITED

The following references are of record in the file of this patent:

UNITED STATES PATENTS

| Number | Name | Date |
| --- | --- | --- |
| 1,746,562 | Sounitza | Feb. 11, 1930 |
| 2,024,793 | Bauml | Dec. 17, 1935 |
| 2,332,777 | Boucher | Oct. 26, 1943 |
| 2,351,081 | Swift | June 13, 1944 |
| 2,364,908 | Miller | Dec. 12, 1944 |
| 2,393,186 | Potter | Jan. 15, 1946 |
| 2,414,566 | Thomas | Jan. 21, 1947 |